United States Patent
Sutter et al.

(10) Patent No.: US 6,713,977 B1
(45) Date of Patent: Mar. 30, 2004

(54) ELECTRONICALLY COMMUTATED MOTOR

(75) Inventors: Joerg Sutter, Gaggenau (DE);
Wolfgang Schwenk, Oberkirch-Tiergarten (DE); Claude Berling, Drusenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,240

(22) PCT Filed: Sep. 14, 2000

(86) PCT No.: PCT/DE00/03194

§ 371 (c)(1),
(2), (4) Date: Jul. 10, 2002

(87) PCT Pub. No.: WO01/20762

PCT Pub. Date: Mar. 22, 2001

(30) Foreign Application Priority Data

Sep. 15, 1999 (DE) .......................... 199 44 196
Sep. 9, 2000 (DE) .......................... 100 44 742

(51) Int. Cl.$^7$ .............................................. H02P 3/08
(52) U.S. Cl. .................. 318/254; 318/138; 318/439; 318/268; 318/720; 318/721; 318/430; 318/434
(58) Field of Search ................. 318/254, 138, 318/439, 268, 430, 431, 434, 721, 720

(56) References Cited

U.S. PATENT DOCUMENTS

| | | | |
|---|---|---|---|
| 4,717,864 A | * 1/1988 | Fultz | ............... 318/254 |
| 5,092,140 A | 3/1992 | Yamamoto et al. | |
| 5,410,230 A | * 4/1995 | Bessler et al. | ............... 318/471 |
| 5,723,933 A | * 3/1998 | Grundl et al. | ............... 310/266 |
| 5,901,268 A | 5/1999 | Yamamoto et al. | |
| 5,963,706 A | * 10/1999 | Baik | ............... 388/804 |

FOREIGN PATENT DOCUMENTS

EP          0 886 057          12/1998

* cited by examiner

*Primary Examiner*—Rina I Duda
(74) *Attorney, Agent, or Firm*—Kenyon & Kenyon

(57) ABSTRACT

An electronically commutatable motor, whose excitation windings are controllable via semiconductor output stages by an electronic control unit with the aid of PWM control signals, a setpoint value being specifiable to the control unit, and the control unit emitting corresponding PWM control signals to the semiconductor output stages; a motor characteristic curve, from which an assigned nominal operating speed is derivable for the setpoint value being stored in the control unit, and the derived nominal operating speed being able to be compared to the actual speed of the motor. It a predefinable or predefined speed difference between the nominal operating speed and the actual speed is exceeded, the control unit and/or the semiconductor output stages can be switched off. The derivation of the nominal operating speed for the predefined setpoint value is facilitated by a three-dimensional characteristics field determined by four coordinate points.

8 Claims, 2 Drawing Sheets

ELECTRONICALLY COMMUTATED MOTOR

FIELD OF THE INVENTION

The present invention relates to an electronically commutatable motor, whose excitation windings are controllable via semiconductor output stages by an electronic control unit with the aid of PWM control signals. A setpoint value can be specified to the control unit, and the control unit emits corresponding PWM control signals to the semiconductor output stages. A motor characteristic curve, from which an assigned nominal operating speed is derivable for the setpoint value is stored in the control unit, and the derived nominal operating speed can be compared to the actual speed of the motor. If a predefinable or predefined speed difference between the nominal operating speed and the actual speed is exceeded, the control unit and/or the semiconductor output stages can be switched off.

BACKGROUND INFORMATION

A conventional electronically commutatable motor is described in German Published Patent Application 198 04 874. In that case, the PWM control signals are established in their pulse width by the input of the setpoint value. The comparison of the nominal operating speed, which is assigned to the setpoint value, to the actual speed, is used during the continuous running operation for detecting sharp increases of the setpoint value acting from outside, in order to set the pulse width only gradually to the new value. Since the motor characteristic curve changes as a function of the motor load and the setpoint value, it requires a considerable expenditure of memory in the control unit to ascertain the allocated nominal operating speed.

Storage of the characteristic-curve data of a motor in a memory of the control unit and use of the characteristic-curve data for deriving an operating value is discussed to some extent in the U.S. Pat. No. 5,901,286 and European Published Patent Application No. 0 886 057. In these references, a characteristics field having a plurality of value pairs is used, from which the desired nominal operating value can be derived by interpolation onto a third coordinate. However, this requires a considerable expenditure of memory, particularly when the load of the motor changes.

The object of the present invention is to provide a motor of the type mentioned at the outset with simple data in the control unit, which, with minimal expenditure, for a predefined load, significantly simplifies the derivation of the nominal operating speed corresponding to a predefined setpoint value.

SUMMARY OF THE INVENTION

According to the present invention, this objective is achieved by storing the motor characteristic curve only as a three-dimensional characteristics field having four corner points, which, through coordination with the smallest pulse width and the limiting values of the supply voltage, as well as with the largest pulse width and the limiting values of the supply voltage, are determined by the nominal operating speeds assigned in each case. The nominal operating speed for the comparison to the actual speed is derivable as a function of the existing supply voltage, the predefined setpoint value and the stored coordinate values of the characteristics field.

In this context, advantage is taken of the fact that in many cases, the motor is always loaded with the same consumer, such as in the case of a fan drive. The four coordinate values of the characteristics field take into account not only the pulse widths of the PWM control signals corresponding to the predefinable setpoint values, but also the fluctuations of the supply voltage, and define a characteristics field which allows a clear and simple derivation, i.e. calculation of the assigned nominal operating speed, for the supply voltage present in each case and the control conditions, the connecting lines of the corner points of the characteristics field giving the stipulations for a grid, and thus facilitating the derivation of intermediate values in the coordinate directions for the supply voltage (e.g. x-coordinate) and the pulse widths (e.g. z-direction), and leading to the sought nominal-operating speed (in the y-direction).

Depending upon the use of the motor, according to a further embodiment, the four corner points of the characteristics field may be determined for a predefined motor load. The motor can then be designed in a simple manner for a different load, i.e. consumer.

In this context, according to one refinement of the present invention, the comparison between the nominal operating speed and the actual speed is able to be carried out continually during the continuous running of the motor or repeated at time intervals.

The setpoint value may be specifiable manually in a simple manner using a potentiometer, the control unit being able to be supplied with a variable setting signal which is used for the emission of allocated PWM control signals for the semiconductor output stages. In addition, using this setting signal, the allocated nominal operating speed may be derived on the basis of the stored motor characteristic curve and utilized for the comparison with the actual speed of the motor arising. The actual speed of the motor may be detected in various different ways.

For the comparison of the nominal operating speed and the actual speed, the control unit is coupled to a comparator unit which may be integrated into the control unit.

So that the overload protection does not react to short interference pulses of the actual-speed measurement, one embodiment of the present invention provides for the control unit and/or the semiconductor output stages to be switched off in a time-delayed manner.

If a run-up phase precedes the continuous operation of the motor, then the overload protection may be designed so that the comparison of the nominal operating speed and the actual speed is first able to be initiated and carried out after a run-up phase of a predefined duration has expired, so that an inadvertent shut-down does not occur during this operating phase. The run-up phase may be preset by the control unit, and the amplitude of the pulses and the pulse width of the PWM control signals, as well as their commutation frequency may be used as parameters. The run-up phase of the motor is able to be initiated with the switch-on of the control unit and/or the semiconductor output stages, and/or the input of a setpoint value for the control unit.

DETAILED DESCRIPTION

Figure 1:
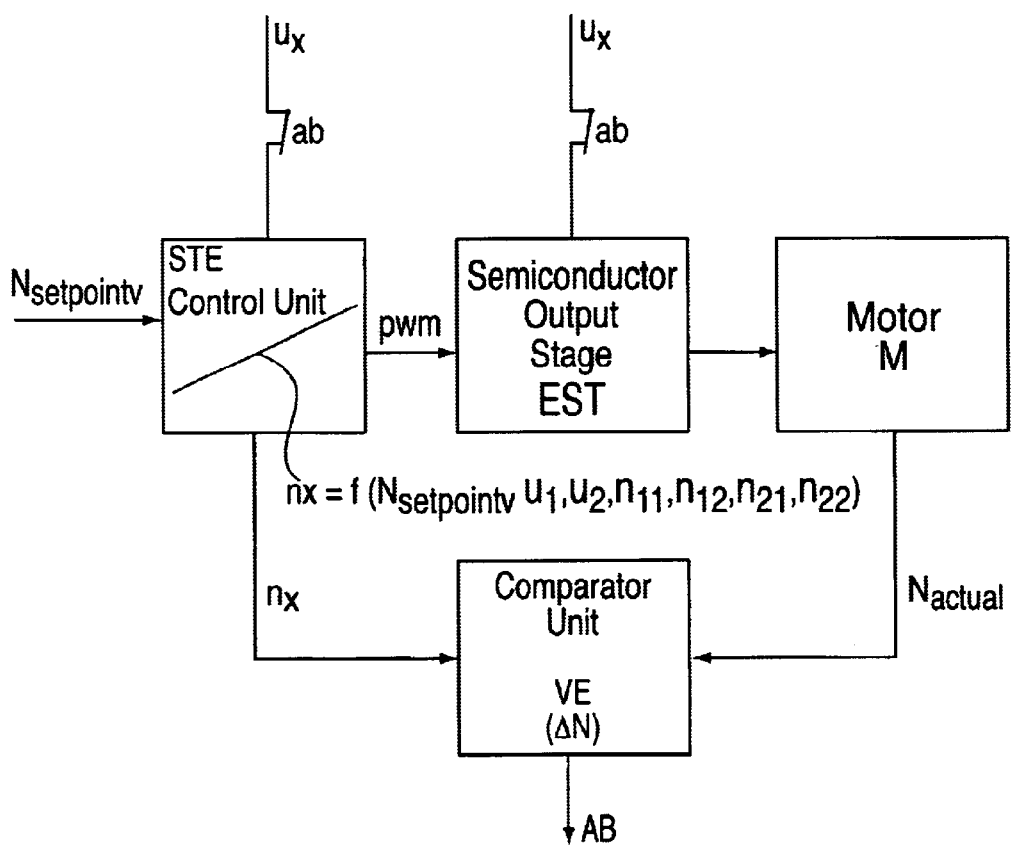
FIG. 1 shows a block diagram of the functional units of an exemplary motor according to an embodiment of the present invention.

As the block diagram according to FIG. 1 shows, the motor unit includes an electronic control unit STE which is assigned a comparator unit VE. For a desired continuous operation, a correspondingly adjusted setpoint value $N_{setpoint\nu}$ is specified and provided to this control unit STE. Consequently, after a run-up phase, correspondingly dimensioned PWM control signals pwm are emitted to semiconductor output stages EST which energize the excitation windings of motor M according to the pulse widths of these PWM control signals pwm. An actual speed $N_{actual}$ thereupon sets in at motor M that is detected and supplied as a signal to a comparator unit VE which may be integrated into control unit STE. Control unit STE stores a motor characteristic curve which allows the derivation of a nominal operating speed $n_x$ for each setpoint value $N_{setpoint\nu}$. This nominal operating speed $n_x$ is obtained more or less exactly in the case of the predefined setpoint value $N_{setpoint\nu}$ if control unit STE, semiconductor output stages EST and motor M are operating correctly, and no conditions exist which lead to a drop in actual speed $N_{actual}$.

Nominal operating speed $n_x$, like actual speed $N_{actual}$, is supplied to comparator unit VE, and a speed deviation $\Delta N$ is ascertained. If actual speed $N_{actual}$ is more than a predefined or predefinable speed deviation $\Delta N$ below expected nominal operating speed $n_x$, then a fault exists which can lead to an overload during continuous operation. Therefore, comparator unit VE generates a switch-off signal AB via which control unit STE and/or semiconductor output stages EST can be switched off, as the contacts AB off in the electric circuit of supply voltage $U_{batt}$ indicate.

If setpoint value $N_{setpoint\nu}$ is changed, then PWM control signals pwm, and therefore actual speed $N_{actual}$ of motor M change, as well. A correspondingly new nominal operating speed $n_x$ is supplied to comparator unit VE, and the comparison is carried out in the same manner for the new continuous operation with altered speed.

The switch-off of control unit STE and/or of semiconductor output stages EST may also be initiated in a delayed fashion, in order to suppress spurious peaks in the derived and detected speed values.

Permissible speed deviation $\Delta N$ may also be made a function of the magnitude of predefined setpoint value $N_{setpoint\nu}$ and the existing magnitude of supply voltage $u_x$. The comparison by comparator unit VE may be carried out continually during the continuous operation, or repeated at time intervals. In addition, the overload protection by the comparison and the shutdown may first be switched to effective after reaching the nominal operating speed specified by the setpoint value, i.e. after a predefined or predefinable run-up time has expired. In this context, the run-up time may be started with the switching-on, that is to say, with the feeding of supply voltage $u_x$ to control circuit STE and/or to semiconductor output stages EST, and/or with the application of a predefined setpoint value $N_{setpoint\nu}$ to control unit STE.

Nominal operating speed $n_x$, derived and calculated by control unit STE, is a function not only of existing supply voltage $u_x$ with its limiting values $u_1$ and $u_2$, but also of stored speeds $n_{11}$, $n_{12}$, $n_{21}$, $n_{22}$ of the corner points of characteristics field KF, as the specification $n_x=f(N_{setpoint\nu}, u_1, u_2, n_{11}, n_{12}, n_{21}, n_{22})$ in the Figure indicates, and as is clarified later.

Figure 2:
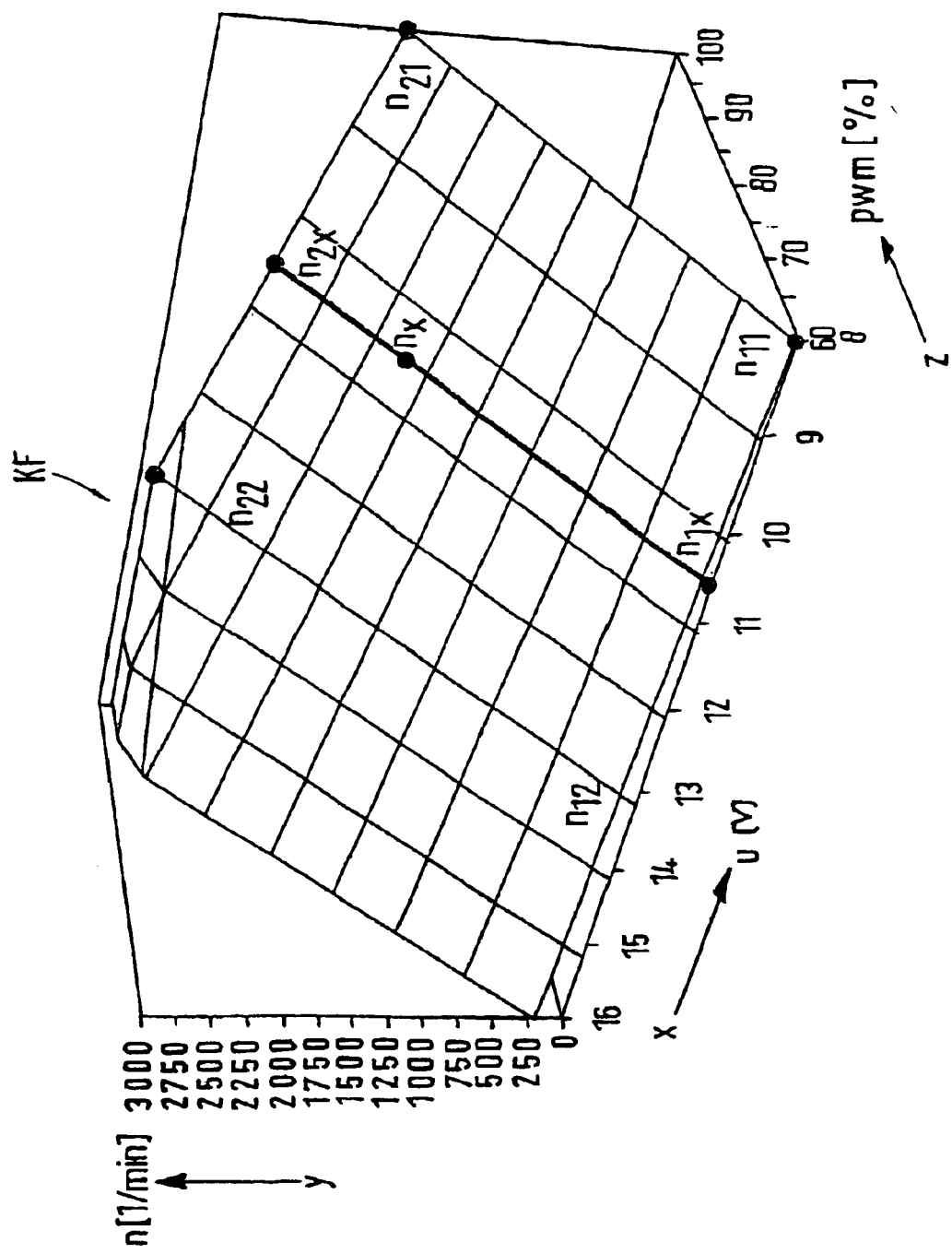
FIG. 2 shows a characteristics field stored in the control unit according to an embodiment of the present invention.

As the three-dimensional characteristics field KF according to FIG. 2 shows, the voltage range from $U_{max}$ to $U_{min}$ is plotted in the x-direction, while the pulse width from $pwm_{min}$ to $pwm_{max}$ extends in the z-direction. In the exemplary embodiment, $U_{max}=13V$ and $U_{min}=8V$ are selected, and the pulse width has a range from $pwm_{min}=60\%$ to $pwm_{max}=100\%$. For the smallest supply voltage, given $pwm_{min}=60\%$ and $pwm_{max}=100\%$, nominal operating speeds of $n_{11}=50$ min$^{-1}$ and $n_{21}=1800$ mm$^{-1}$ result, while for the greatest supply voltage, given $pwm_{min}=60\%$ and $pwm_{max}=100\%$, nominal operating speeds $n_{12}=150$ min$^{-1}$ and $n_{22}=2900$ min$^{-1}$ result. These nominal operating speeds $n_{11}$ to $n_{22}$ define the four corner points P1 to P4 in three-dimensional characteristics field KF. The connecting lines between corner points $n_{11}$ and $n_{21}$, $n_{11}$ and $n_{12}$, $n_{21}$ and $n_{22}$, and $n_{12}$ and $n_{22}$, respectively, permit the formation of a grid which, for existing supply voltages $U_x$ and pulse width $pwm_x$ corresponds to a setpoint value. Formation of the grid allows the derivation of allocated nominal operating speeds $n_x$ on straight line $n1_x$–$n2_x$. Thus, given a supply voltage of $U_x=10.5V$ and a pulse width of approximately 87%, a nominal operating speed of approximately 1800 min$^{-1}$ can be interpolated from characteristics field KF.

This characteristics field KF is valid for a specific motor for a predefined, constant load. For a further load, a characteristics field KF valid for the further load can be stored in control unit STE.

As the three-dimensional characteristics field KF according to FIG. 2 shows, supply voltage $u_x$ having the voltage range from smallest supply voltage $u_1=8V$ to greatest supply voltage $u_2=13V$ is plotted in the x-direction. In the z-direction, pulse width pwm of the PWM control signals is predefined, which may extend from minimal pulse width $pwm_1=60\%$ to maximum pulse width $pwm_2=100\%$. Given a preselected load of the motor, four limit operation cases are ascertained with $u_1$ and $pwm_1$, $u_1$ and $pwm_2$, $u_2$ and $pwm_1$, as well as $u_2$ and $pwm_2$, which lead to nominal operating speeds $n_x=n_1$, $n_{12}$, $n_{21}$ and $n_{22}$, and consequently define characteristics field KF according to FIG. 2.

If motor M is loaded with a different load, then a similar characteristics field KF results having new nominal operating speeds $n_{11}$, $n_{12}$, $n_{21}$ and $n_{22}$.

The following values result for characteristics field KF of an exemplary embodiment shown in FIG. 2:

$n_{11}=50$ min$^{-1}$ at $u_1=8V$ and $pwm_1=60\%$ $n_{12}=150$ min$^{-1}$ at $u_2=13V$ and $pwm_1=60\%$ $n_{21}=1800$ min$^{-1}$ at $u_1=8V$ and $pwm_2=100\%$ $n_{22}=2900$ min$^{-1}$ at $u_2=13V$ and $pwm_2=100\%$ Characteristics field KF can be represented as a grid, the connecting lines between corner points $n_{11}$ and $n_{12}$, and $n_{21}$ and $n_{22}$, respectively, as well as $n_{11}$ and $n_{22}$, and $n_{12}$ and $n_{22}$, respectively, specifying the gridding, and as is shown, for an existing supply voltage $u_x$, permitting the derivation of allocated nominal operating speed $n_x$ in the case of existing PWM control signal $p_x$. PWM control signal $pwm_x$ is allocated to predefined setpoint value $N_{setpoint\nu}$.

As grid line $nx_1$–$nx_2$ shows, in the case of $u_x=10.5V$ and a pulse width of $pwm_x \approx 87.5\%$, the derivation of nominal operating speed $n_x$ leads to a value of approximately 1800 min$_{-1}$.

To calculate nominal operating speed $n_x$ allocated to a setpoint value $N_{setpoint\nu}$, one proceeds as follows with interpolated coefficients stg1, stg2 and stg3:

$$stg1 = \frac{n_{12} - n_{11}}{u_2 - u_1} \quad stg2 = \frac{n_{22} - n_{21}}{u_2 - u_1}$$

$$n_{1x} = n_{11} + stg_1 * (u_x - u_1)$$

$$n_{2x} = n_{21} + stg_2 * (u_x - u_1)$$

$$stg_3 = \frac{n_{2x} - n_{1x}}{pwm_2 - pwm_1} = \frac{n_{21} - n_{11} + (stg_2 - stg_1) * (u_x - u_1)}{pwm_2 - pwm_1}$$

Thus, $$n_x = n_{1x} + stg_3 * (pwm_x - pwm_1)$$

Since the calculations use the reciprocal of the speed values, the above equation for calculating surface point $n_x$ must be changed around accordingly. With $T_x = a/n_x$, it follows that:

$$\frac{a}{T_x} = n_{1x} + stg_3 * (pwm_x - pwm_1)$$

$$T_x = \frac{a * (pwm_1 - pwm_2)}{(((stg_1 - stg_2) * u_x - n_{21} + n_{11} + (stg_2 - stg_1) * u_1) * pwm_x + (pwm_1 * stg_2 - pwm_2 * stg_1) * u_x + pwm_1 * (n_{21} - u_1 * stg_2) + pwm_2 * (stg_1 * u}$$

In the formula above, only supply voltage $U_x$ and the pulse width of output-stage control $pwm_x$ are variable. The remaining factors may be stored as fixed parameters in the ROM or EEPROM. Following is once again the same formula with the variable names used in the program code.

$$v\_tx = \frac{K\_ZAEHL_1}{((K\_NENN_1 + v\_ubat + K\_NENN_2) * v\_pwm\_endst + K\_NENN_3 * v\_ubat + K\_NENN_4)}$$

During the programming at the rear end of the assembly line, the corresponding parameters can now be transferred from the test stand into the EEPROM of the motor control.

Wherein:
K_NENN$_1$=(stg$_1$-stg$_2$)
K_NENN$_2$=(-n$_{21}$+n$_{11}$+(stg$_2$-stg$_1$)*u$_1$)
K_NNEN$_3$=(pwn$_1$*stg$_2$-pwm$_2$* stg$_1$)
K_NENN$_4$=pwm$_1$*(n$_{21}$-u$_1$*stg$_2$)+pwm$_2$*(stg$_1$*u$_1$-n$_{11}$)
K_ZAEHL$_1$=a*(pwm$_1$-pwm$_2$)
v_ubat=u$_x$
v_pwm endst=pwm$_x$.

What is claimed is:

1. An electronically commutatable motor having excitation windings, comprising:
at least one semiconductor output stage;
an electronic control unit controlling the excitation windings via the at least one semiconductor output stage by emitting control signals corresponding to an adjustable control signal and a setpoint value, the electronic control unit further storing a motor characteristic curve from which an assigned nominal operating speed is derivable for the setpoint value, the derived nominal operating speed being comparable to an actual speed of the motor;
wherein, if a predefined speed difference between the nominal operating speed and the actual speed is exceeded, at least one of the electronic control unit and the at least one semiconductor output stage can be switched off, and
wherein the motor characteristic curve is stored as a characteristics field having four three-dimensional corner points, each representing operating speeds of a characteristics field for a predefined, constant load, the corner points being determined by limiting values of a supply voltage and limiting values of the control signals, lines connecting the four corner points of the characteristics field permitting formation of a grid, from which, for an existing supply voltage and a control signal corresponding to the predefined setpoint value, the nominal operating speed is derivable from comparison to the measured actual speed.

2. The electronically commnutatable motor of claim 1, wherein comparison between the nominal operating speed and the actual speed is carried in one of the following ways:
i) continually during a continuous operation of the motor; and
ii) repeated at time intervals.

3. The electronically commutatable motor of claim 1, wherein the setpoint value is manually adjusted using a potentiometer.

4. The electronically commutatable motor of claim 1, wherein, for comparison of the nominal operating speed and the actual speed, the electronic control unit is coupled to a comparator unit.

5. The electronically commutatable motor of claim 1, wherein the comparator unit is integrated into the electronic control unit.

6. The electronically commutatable motor of claim 1, wherein the switching off of the at least one of the electronic control unit and the at least one semiconductor output stage is carried out in a time-delayed manner.

7. The electronically commutatable motor of claim 1, wherein comparison of the nominal operating speed and the actual speed is initiated and carried out only after a ran-up phase of a predefined duration has expired.

8. The electronically commutatable motor of claim 7, wherein the run-up phase can be initiated with a switching-on of at least one of the electronic control unit, the at least one semiconductor output stage, and the input of a setpoint value.

* * * * *

UNITED STATES PATENT AND TRADEMARK OFFICE
CERTIFICATE OF CORRECTION

PATENT NO. : 6,713,977 B1
DATED : March 30, 2004
INVENTOR(S) : Joerg Sutter et al.

It is certified that error appears in the above-identified patent and that said Letters Patent is hereby corrected as shown below:

Title page,
*Primary Examiner*, change "Rina I Duda" to -- Rina I. Duda --
Item [57], ABSTRACT,
Line 10, change "motor. It a" to -- motor. If a --

Column 2,
Line 45, change "motor,-then the" to -- motor, then the --

Column 4,
Lines 63-64, change "1800 $min_{-1}$." to -- 1800 $min^{-1}$. --

Signed and Sealed this

Ninth Day of August, 2005

JON W. DUDAS
*Director of the United States Patent and Trademark Office*